(12) United States Patent
Kuwahara

(10) Patent No.: US 7,840,823 B2
(45) Date of Patent: Nov. 23, 2010

(54) PROCESSOR SYSTEM FOR VARYING CLOCK FREQUENCY AND VOLTAGE IN RESPONSE TO A COMPARISON OF INSTRUCTION EXECUTION RATE TO A REFERENCE VALUE

(75) Inventor: Yuji Kuwahara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 665 days.

(21) Appl. No.: 11/892,340

(22) Filed: Aug. 22, 2007

(65) Prior Publication Data

US 2008/0059817 A1    Mar. 6, 2008

(30) Foreign Application Priority Data

Aug. 29, 2006  (JP) .............................. 2006-232276

(51) Int. Cl.
*G06F 1/00* (2006.01)
*G06F 1/26* (2006.01)
*G06F 1/32* (2006.01)
*G06F 9/00* (2006.01)
*G06F 9/46* (2006.01)

(52) U.S. Cl. ....................... 713/300; 713/320; 713/322; 712/220; 718/100

(58) Field of Classification Search ................. 713/300, 713/320, 322; 712/220; 718/100
See application file for complete search history.

(56) References Cited

U.S. PATENT DOCUMENTS

| 6,513,124 | B1 * | 1/2003 | Furuichi et al. ............. 713/322 |
| 6,928,566 | B2 | 8/2005 | Nunomura |
| 6,996,730 | B2 * | 2/2006 | Bonnett ...................... 713/322 |
| 7,111,179 | B1 * | 9/2006 | Girson et al. ............... 713/300 |
| 7,146,513 | B2 | 12/2006 | Misaka et al. |
| 7,313,711 | B2 * | 12/2007 | Bullman ...................... 713/322 |
| 7,346,787 | B2 * | 3/2008 | Vaidya et al. ............... 713/300 |

(Continued)

FOREIGN PATENT DOCUMENTS

CN    1549961 A    11/2004

(Continued)

OTHER PUBLICATIONS

Chinese Office Action, w/ English translation thereof, issued in Chinese Patent Application No. CN 200710148549.5 dated Apr. 1, 2010.

(Continued)

*Primary Examiner*—Ji H Bae
(74) *Attorney, Agent, or Firm*—McDermott Will & Emery LLP

(57) ABSTRACT

A processor system includes a processor which has an internal memory, an external memory, and a bus controller which controls a bus to which the processor and the external memory are connected. The processor system also includes a measurement unit for measuring an instruction-execution rate of the processor, a clock controller for supplying the processor, the external memory, and the bus controller with clock signals having clock frequencies corresponding to the instruction-execution rate measured by the measurement unit, respectively, and a voltage controller for controlling a source voltage or a threshold voltage which are supplied to the processor, the external memory, and the bus controller, in accordance with the respective clock frequencies of the clock signals supplied to the processor, the external memory, and the bus controller.

4 Claims, 5 Drawing Sheets

U.S. PATENT DOCUMENTS

| | | |
|---|---|---|
| 7,376,849 B2 * | 5/2008 | Tschanz et al. ............. 713/322 |
| 2004/0073826 A1 | 4/2004 | Yamashita et al. |
| 2005/0102560 A1 | 5/2005 | Taketoshi et al. |
| 2006/0123253 A1 * | 6/2006 | Morgan et al. ............. 713/300 |
| 2006/0265609 A1 * | 11/2006 | Fung ........................ 713/300 |

FOREIGN PATENT DOCUMENTS

| | | |
|---|---|---|
| JP | 10-143274 | 5/1998 |
| JP | 11-110063 | 4/1999 |
| JP | 2004-038291 | 2/2004 |
| JP | 2005-115769 | 4/2005 |
| JP | 2005-128937 | 5/2005 |
| WO | WO 03/021409 A2 | 3/2003 |

OTHER PUBLICATIONS

Japanese Office Action issued in Japanese Patent Application No. JP 2006-232276 dated Sep. 7, 2010.

* cited by examiner

PROCESSOR SYSTEM FOR VARYING CLOCK FREQUENCY AND VOLTAGE IN RESPONSE TO A COMPARISON OF INSTRUCTION EXECUTION RATE TO A REFERENCE VALUE

BACKGROUND OF THE INVENTION

1. Field of the Invention

The present invention relates to a processor system for low power consumption while satisfying a required processing capability.

2. Description of the Related Art

A low-power consuming mobile device powered by a battery has been demanded. The mobile device includes processors for performing various processes such as relating to Internet connection, digital TV watching, and motion replay, and power consumption in the mobile device increases in proportion to an increase in circuit size or in process number. On this account, for example, in the invention described in Japanese Unexamined Patent Application Publication No. 11-110063, in order to reduce power consumption of processors represented by CPU or MPU, supply of the clock signals to the processor is controlled in accordance with loads of the corresponding processor.

However, by only controlling supply of clock signals to the processor, it is difficult to reduce power consumption greatly while satisfying a required processing capability.

SUMMARY OF THE INVENTION

It is an object of the invention to provide a processor system for low power consumption while satisfying a required processing capability.

According to a first aspect of the invention, there is provided a processor system including a processor which has an internal memory, an external memory, and a bus controller which controls a bus to which the processor and the external memory are connected, in which the system includes a measurement unit for measuring an instruction-execution rate of the processor, a clock controller for supplying the processor, the external memory, and further including the bus controller with clock signals having clock frequencies corresponding to the instruction-execution rate measured by the measurement unit, respectively, and a voltage controller for controlling a source voltage or a threshold voltage which are supplied to the processor, the external memory, and the bus controller, in accordance with the respective clock frequencies of clock signals supplied to the processor, the external memory, and the bus controller.

According to the above-mentioned aspect of the invention, the clock controller has a comparator for comparing the instruction-execution rate which is obtained by the measurement unit with a reference value, and the clock controller lowers the clock frequencies of the processor and raises clock frequencies of the external memory and the bus controller, when the instruction-execution rate is less than the reference value.

According to the above-mentioned aspect of the invention, the clock controller has a comparator for comparing the instruction-execution rate obtained by the measurement unit with a reference value, and the clock controller raises the clock frequencies of the processor are raised and lowers the clock frequencies of the external memory and the bus controller, when the instruction-execution rate is not less than the reference value.

According to the above-mentioned aspect of the invention, the voltage controller decreases a source voltage supplied to means which is supplied with the clock signal having a low clock frequency and increases a source voltage supplied to means which is supplied with the clock signal having a high clock frequency.

According to the above-mentioned aspect of the invention, the voltage controller increases a threshold voltage of a transistor of means which is supplied the clock signal having a low clock frequency and decreases a threshold voltage of a transistor of means which is the clock signal having a high clock frequency.

According to the above-mentioned aspect of the invention, the measurement unit has a task information processing section determining a switching of a task in the processor on the basis of task information on the task performed by the processor, and the clock controller controls the clock frequencies of the clock signals supplied to the processor, the external memory, and the bus controller, respectively, whenever the task is switched.

According to the invention, it is possible to realize a low-power consuming processor system while satisfying a required processing capability.

DESCRIPTION OF THE PREFERRED EMBODIMENTS

Figure 1:
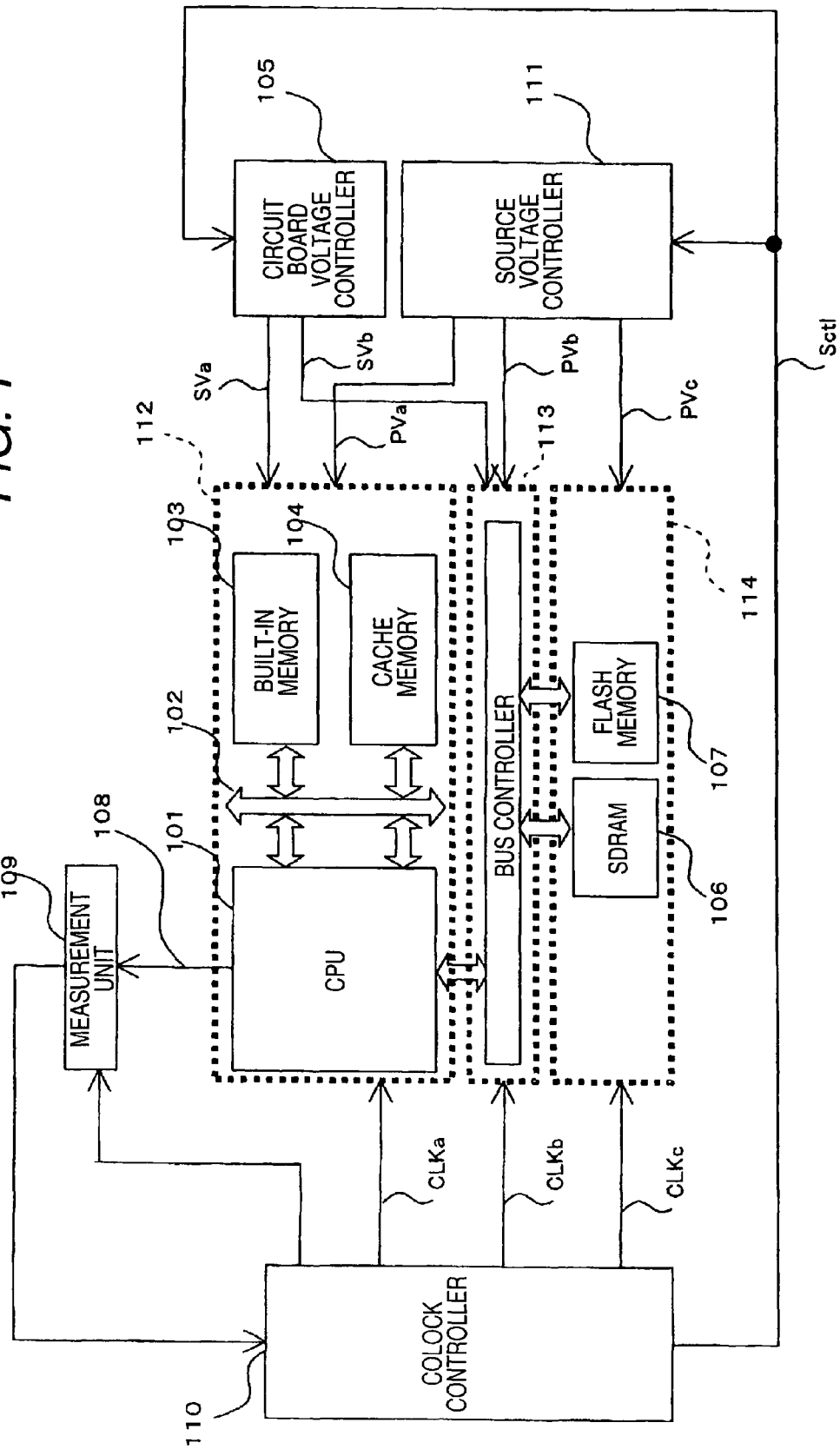
FIG. 1 is a block diagram illustrating a processor system of a first embodiment.

Hereinafter, referring to the drawings, embodiments of the invention will be described.

First Embodiment

FIG. 1 is a block diagram illustrating a processor system of a first embodiment. As shown in FIG. 1, a processor system of a first embodiment includes a processor block 112, a bus controller 113, an external device 114, a measurement unit 109, a clock controller 110, a source voltage controller 111, and a circuit board voltage controller 105. The processor block 112 includes a CPU 101, a built-in memory 103 and a cache memory 104 which are connected to each other through an internal bus 102. The bus controller 113 controls an external bus connected to the CPU 101 and the external device 114. The external device 114 includes a SDRAM 106 and a FLASH memory 107.

The CPU 101 can access the built-in memory 103 or the cache memory 104 through the internal bus 102 by using a small number of process cycles. Meanwhile, the CPU 101 can access the external device 114 through the external bus, but the access requires a larger number of process cycles than the number of process cycles required in the access through the internal bus 102. That is, the CPU 101 can access the internal memory through the internal bus 102 at high speed, and the CPU 101 can access the external memory through the external bus at low speed.

The measurement unit 109 calculates an instruction-execution rate by measuring the number of instruction executions on the basis of an instruction-execution complete signal 108 outputted from the CPU 101. The clock controller 110 supplies the processor block 112, the bus controller 113 and the external device 114 with clock signals CLKa to CLKc based on the information acquired from the measurement unit 109, respectively. The clock controller 110 supplies the source voltage controller 111 with a clock control signal Sct1 based on the instruction-execution rate acquired from the measurement unit 109. The source voltage controller 111 supplies the processor block 112, the bus controller 113 and the external device 114 with source voltages PVa to PVc based on the clock control signal Sct1, respectively. The circuit board voltage controller 105 supplies the processor block 112 and the bus controller 113 with circuit board voltages SVa to SVb based on the clock control signal Sct1, respectively.

Figure 2:
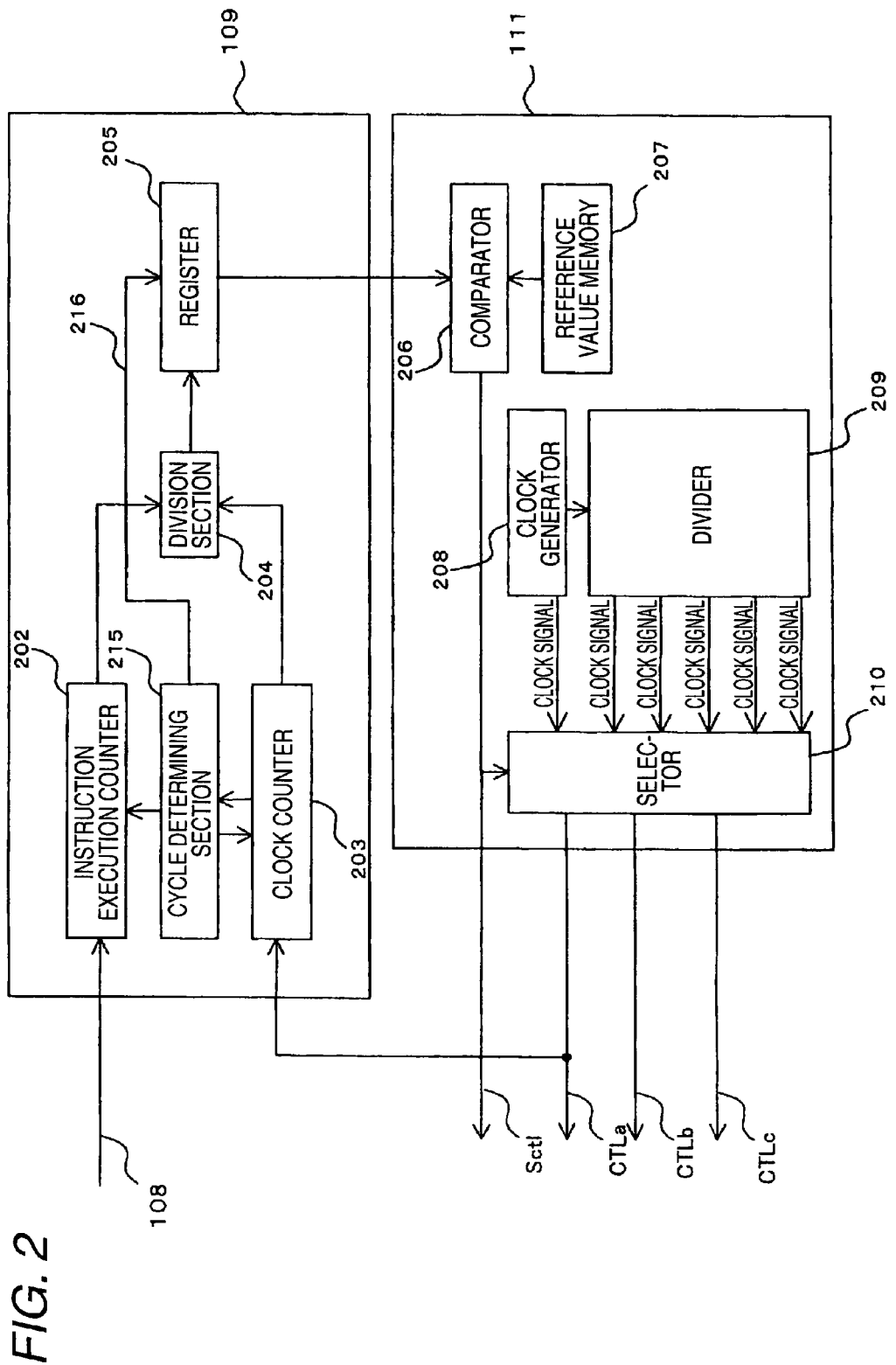
FIG. 2 is a block diagram illustrating an internal configuration of a measurement unit and a clock controller included in the processor system of the first embodiment.

FIG. 2 is a block diagram illustrating an internal configuration of the measurement unit 109 and the clock controller 110 included in the processor system of the first embodiment. As shown in FIG. 2, the measurement unit 109 includes an instruction execution counter 202, a clock counter 203, a division section 204, a register 205, and a cycle determining section 215. The clock controller 110 includes a comparator 206, a reference value memory 207, a clock generator 208, a divider 209, and selectors 210.

The measurement unit 109 increments the instruction execution counter 202 when detecting the instruction-execution complete signal 108 outputted from the CPU 101. The count value of the instruction execution counter 202 represents the number of instruction executions. the clock counter 203 is incremented by a clock signal CTLa supplied to the processor block 112 from the clock controller 110 while the instruction execution counter 202 is operating. A count value of the clock counter 203 represents the number of clocks. The cycle determining section 215 monitors the count value of the clock counter 203. When the count value monitored by the cycle determining section 215 reaches a predetermined value, the division section 204 divides the count value of the instruction execution counter 202 (i.e. the number of the instruction executions) by the count value of the clock counter 203 (i.e. the clock number), thereby calculating the instruction-execution rate. The instruction-execution rate obtained from the division section 204 is stored in the register 205.

The comparator 206 of the clock controller 110 compares the instruction-execution rate stored in the register 205 of the measurement unit 109 with at least one reference value stored in the reference value memory 207. The comparator 206 generates the clock control signal corresponding to the comparison result. The generated clock control signal is inputted to the selectors 210 in the source voltage controller 111 and the clock controller 110. The clock generator 208 generates a clock signal of the highest frequency that is required by the system of the embodiment. The generated clock signal is divided by the divider 209 into plural signals, and the divider 209 outputs the plural clock signals having different frequencies to the selectors 210. The plural clock signals obtained from the divider 209 and the clock signal of the highest frequency generated by the clock generator 208 are inputted to the selectors 210. The selectors 210 selectively output clock signals of the inputted clock signals supplied to the processor block 112, the bus controller 113 and the external device 114, respectively, in accordance with the clock control signal outputted from the comparator 206.

Figure 3:
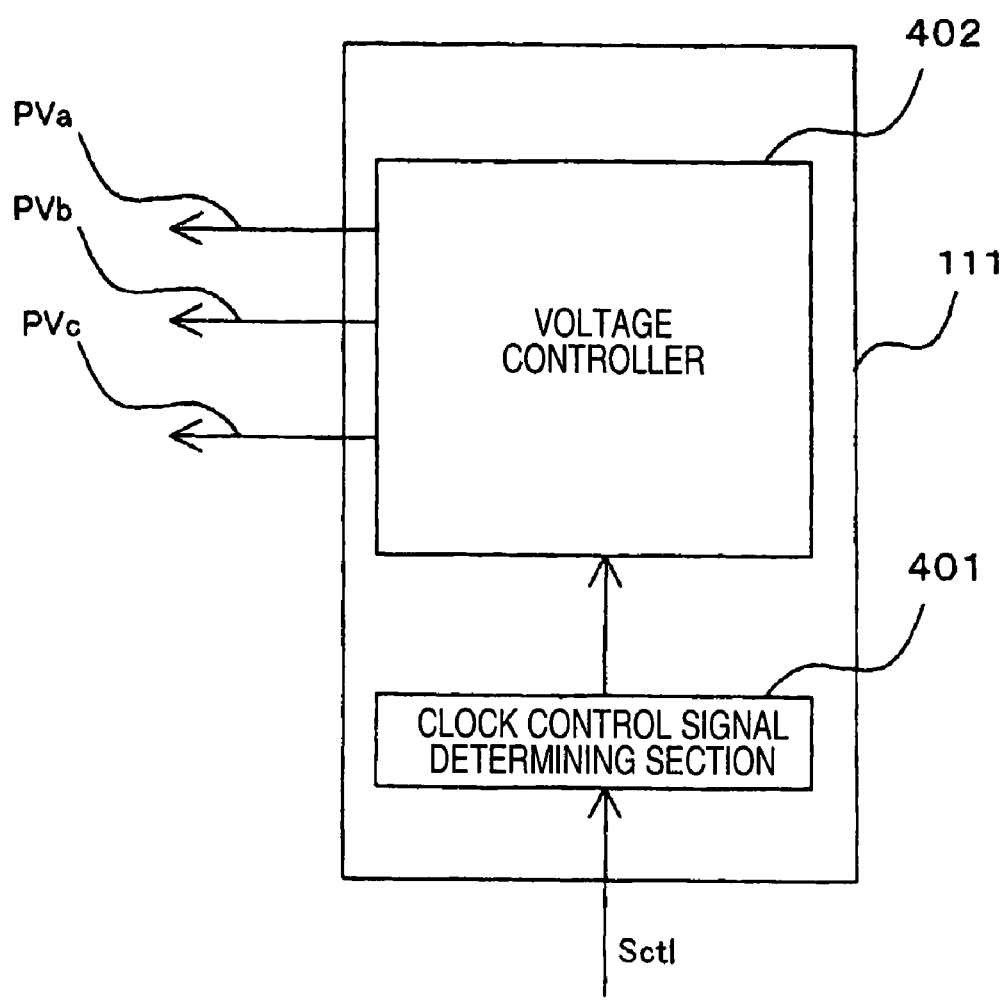
FIG. 3 is a block diagram illustrating an internal configuration of a source voltage controller included in the processor system of the first embodiment.

FIG. 3 is a block diagram illustrating an internal configuration of a source voltage controller 111 included in the processor system of the first embodiment. As shown in FIG. 3, the source voltage controller 111 includes a clock control signal determining section 401 and voltage controller 402. The clock control signal determining section 401 determines the source voltages PVa to PVc to be supplied to the processor block 112, the bus controller 113 and the external device 114 on the basis of the inputted clock control signals, respectively. The voltage controller 402 supplies the processor block 112, the bus controller 113 and the external device 114 with the source voltages determined by the clock control signal determining section 401, respectively. The circuit board voltage controller 105 controls the circuit board voltage on the basis of the clock control signal, and has the same configuration as that of the source voltage controller 111.

Hereinafter, a basis criterion of judgment when the comparator 206 of the clock controller 110 generates the clock control signal Sct1 will be described. By taking advantage of the built-in memory 103 and the cache memory 104 of the processor block 112 in an effective manner, it is possible to increase the instruction-execution rate of the CPU 101, in other words, the number of instruction executions per one clock (i.e. IPC: Instruction Per Cycle) thereof. Conversely, when these memories can not be effectively used, the IPC is lowered. The reason is that it is necessary to input or write instruction commands executed and data loaded or stored by the CPU 101 from the external device 114 through the external bus.

In this manner, when the IPC has a high value, it is expected that the built-in memory 103 and cache memory 104 of the processor block 112 are effectively used, and the bus controller 113 and the external device 114 of the external bus less frequently operated. In this case, though the bus controller 113 and the external device 114 have low processing speed, it does not have great influence on the system processing capability. For this reason, when the IPC has a high value, the comparator 206 generates the clock control signal Sct1 for raising the clock frequency of the CPU 101 and lowering the clock frequencies of the bus controller 113 and the external device 114. Conversely, when the IPC has a low value, it is expected that the built-in memory 103 and cache memory 104 of the processor block 112 are less effectively used, and the processing speed of the bus controller 113 and the external device 114 has great influence on the system processing capability. For this reason, when IPC has a low value, the comparator 206 generates the clock control signal Sct1 for lowering the clock frequency of the CPU 101 and raising the clock frequencies of the bus controller 113 and the external device 114. As the result, it is possible to realize a low-power consuming process system while satisfying the processing capability required for the system.

When determining whether the IPC has a high value or a low value, the comparator 206 refers to a table in which the clock frequencies of the clock signals supplied to the processor block 112, the bus controller 113, and the external device 114 are enlisted on the basis of a comparison result between the IPC and reference value. In the embodiment, two reference values, that is, a high reference value and a low reference value are used, and the IPC acquired from the measurement unit 109 is compared with these two reference values. The comparator 206 compares the IPC with the two reference values, and thus judging that the IPC corresponds to any one of three states where the IPC is not less than the high reference value (a state A), the IPC is less than the low reference value (a state B), and the IPC is not less than the low reference value and less than the high reference value (a state C).

When the state A is judged, the comparator 206 generates the clock control signal for setting the clock frequency of the CPU 101 by 240 MHz, the clock frequency of the external bus by 60 MHz, and the clock frequency of the external device 114 by 60 MHz. When the state B is judged, the comparator 206 generates the clock control signal setting the clock frequency of the CPU 101 by 80 MHz, the clock frequency of the external bus by 120 MHz, and the clock frequency of the external device 114 by 120 MHz. When the state C is judged, the comparator 206 generates the clock control signal setting the clock frequency of the CPU 101 by 120 MHz, the clock frequency of the external bus by 120 MHz, and the clock frequency of the external device 114 by 120 MHz.

Hereinafter, in the source voltage controller 111 and the circuit board voltage controller 105, the relationship among clock frequency, source voltage, and threshold voltage of a transistor will be described.

Assuming that the leakage current doesn't exist, relationship among power consumption, clock frequency, and source voltage of a CMOS circuit are represented as the following expression 1.

$$P \approx K \times C \times Vdd^2 \times f \qquad (1)$$

where P is the power consumption, K is switching probability, C is transistor capacity, Vdd is the source voltage, and f is the clock frequency.

The transistor capacity C is uniquely determined by the circuit. The switching probability K is determined in accordance with process details of the circuit or software therefor. By controlling the source voltage Vdd and the clock frequency f in accordance with the system processing state, it is possible to reduce the power consumption of the system. Here, in the case where only the clock frequency f is lowered, the power consumption may decrease when comparing them in a certain interval. However, since the processing time required to satisfy throughput requirement increases as the clock frequency decreases, a great decrease in the accumulated power consumption can not be expected. With the recent trend of miniaturization in the semiconductor process, it is necessary to take the leakage current as well as the operation current into consideration when calculating the power consumption. For this reason, a decrease in the leakage current is also effective in decreasing the power consumption.

Relationship among circuit delay, the source voltage, and the threshold voltage is represented as the following expression 2.

$$Td \approx Vdd \times C/(Vdd-Vt)^2 \qquad (2)$$

where Td is the circuit delay, C is load capacity, Vdd is the source voltage, and Vt is the threshold voltage of the transistor.

Relationship between the leakage current and the threshold voltage is represented as the following expression 3.

$$Ileak \approx 10^{(-Vt/S)} \qquad (3)$$

where Ileak is the leakage current, Vt is the threshold voltage of the transistor, and S is a sub-threshold coefficient (i.e. a sub-threshold factor).

According to the expression 2, when the threshold voltage Vt of the transistor is raised or the source voltage Vdd is lowered, the circuit delay Td increases. According to the expression 3, when the threshold voltage Vt of the transistor is raised, the leakage current Ileak is lowered. Accordingly, by lowering the clock frequency f to increase allowable circuit delay Td and lowering the source voltage Vdd, by that amount to lower the power consumption P or raise the threshold voltage Vt, the leakage current Ileak can be lowered. That is, since the allowable circuit delay increases when the clock frequency is low, the circuit can be operated with the low source voltage or the high threshold voltage. Conversely, since the allowable circuit delay decreases when the clock frequency is high, the circuit can be operated with the high source voltage or the low threshold voltage.

For this reason, the source voltage controller 111 and the circuit board voltage controller 105 control the source voltage and circuit board voltage supplied to the processor block 112, the bus controller 113, and the external device 114, on the basis of the clock control signal inputted from the clock controller 110. Consequently, the source voltage controller 111 and the circuit board voltage controller 105 supply the source voltage and the circuit board voltage of the magnitude corresponding to the clock frequencies of the processor block 112, bus controller 113, and external device 114.

As mentioned above, in the processor system of the embodiment, when the instruction-execution rate is high, the clock frequency of the CPU 101 is raised and the clock frequencies of the bus controller 113 and the external device 114 are lowered. Meanwhile, when the instruction-execution rate is low, the clock frequency of the CPU 101 is lowered and the clock frequencies of the bus controller 113 and the external device 114 are raised. Additionally, at least one of the source voltage and circuit board voltage to be supplied to the processor block 112, the bus controller 113, and the external device 114 is controlled in accordance with these clock frequencies. As the result, it is possible to reduce power consumed by the system while satisfying processing capability requirement of the system.

Second Embodiment

Figure 4:
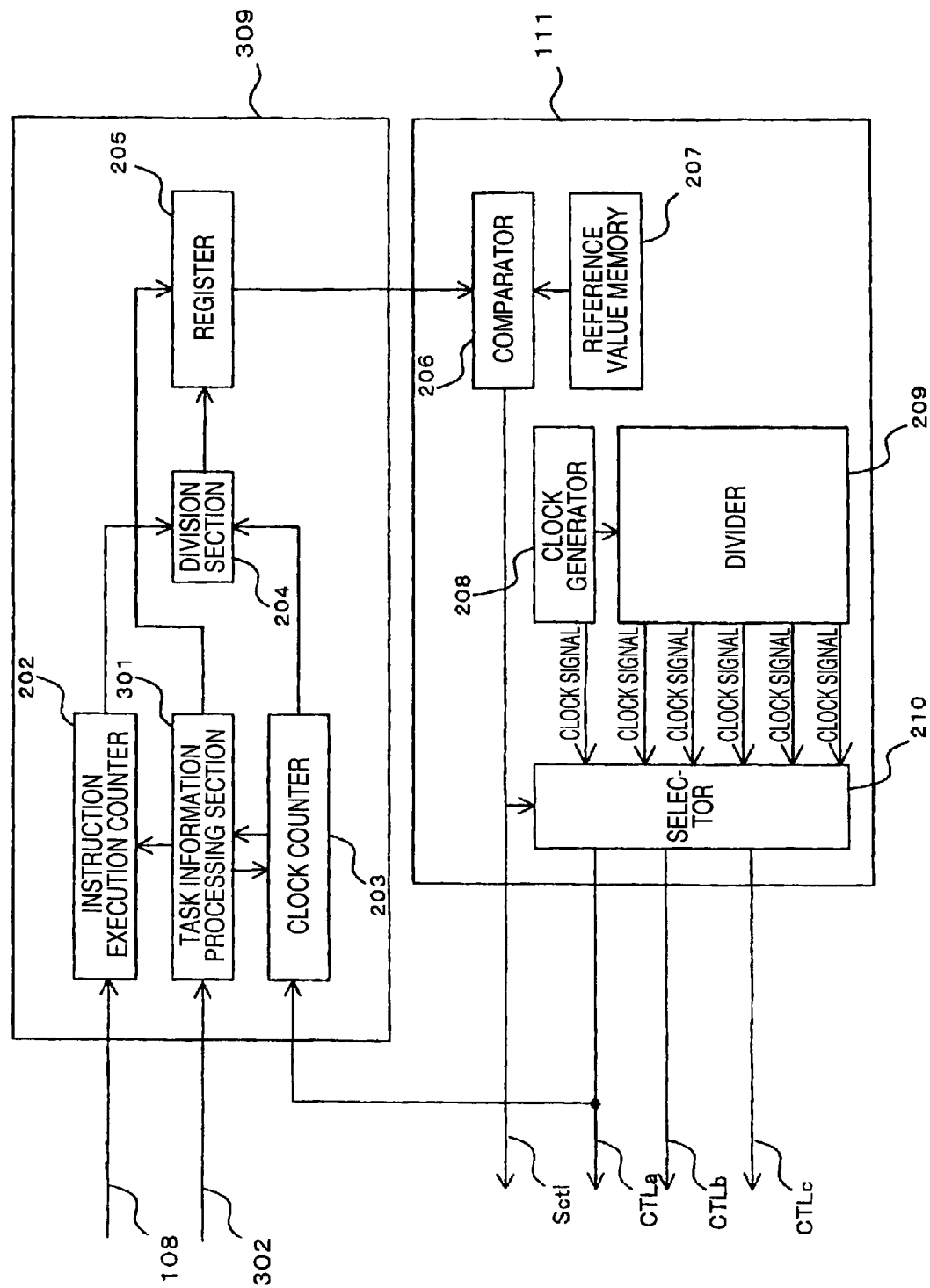
FIG. 4 is a block diagram illustrating an internal configuration of a measurement unit and a clock controller included in a processor system of a second embodiment.

FIG. 4 is a block diagram illustrating an internal configuration of a measurement unit and a clock controller included in a processor system of a second embodiment. The different point between processor system of the second embodiment and the processor system of the first embodiment is the measurement unit. Except for this point, the second embodiment is the same as the first embodiment. In FIG. 4, the common elements with FIG. 1 are referenced by the same reference numerals.

A measurement unit 309 of the embodiment has a task information processing section 301 instead of the cycle determining section 215 included in the measurement unit 109 of the first embodiment. Task information 302 is inputted to the task information processing section 301 from the CPU 101. The task is defined as an execution unit performed by an operating system installed in the processor system of the embodiment, and includes plural program functions. The task information may be identification numbers given for every task as long as the information can be used to discriminate the difference between the tasks.

The task information processing section 301 determines switching of the task in the CPU 101 on the basis of the inputted task information. When the task information processing section 301 determines the switching of the task, the section stores respective count values of the instruction execution counter 202 and clock counter 203 with the task information in the register 205 at the moment. The division section 204 of the embodiment calculates the instruction-execution rate in the process of the task, by dividing the count value of the instruction execution counter 202 (i.e. the number of instruction executions in the process of the task) by the count value of the clock counter 203 (i.e. the clock number in the process of the task). The instruction-execution rate obtained from division section 204 is stored in the register 205.

Figure 5:
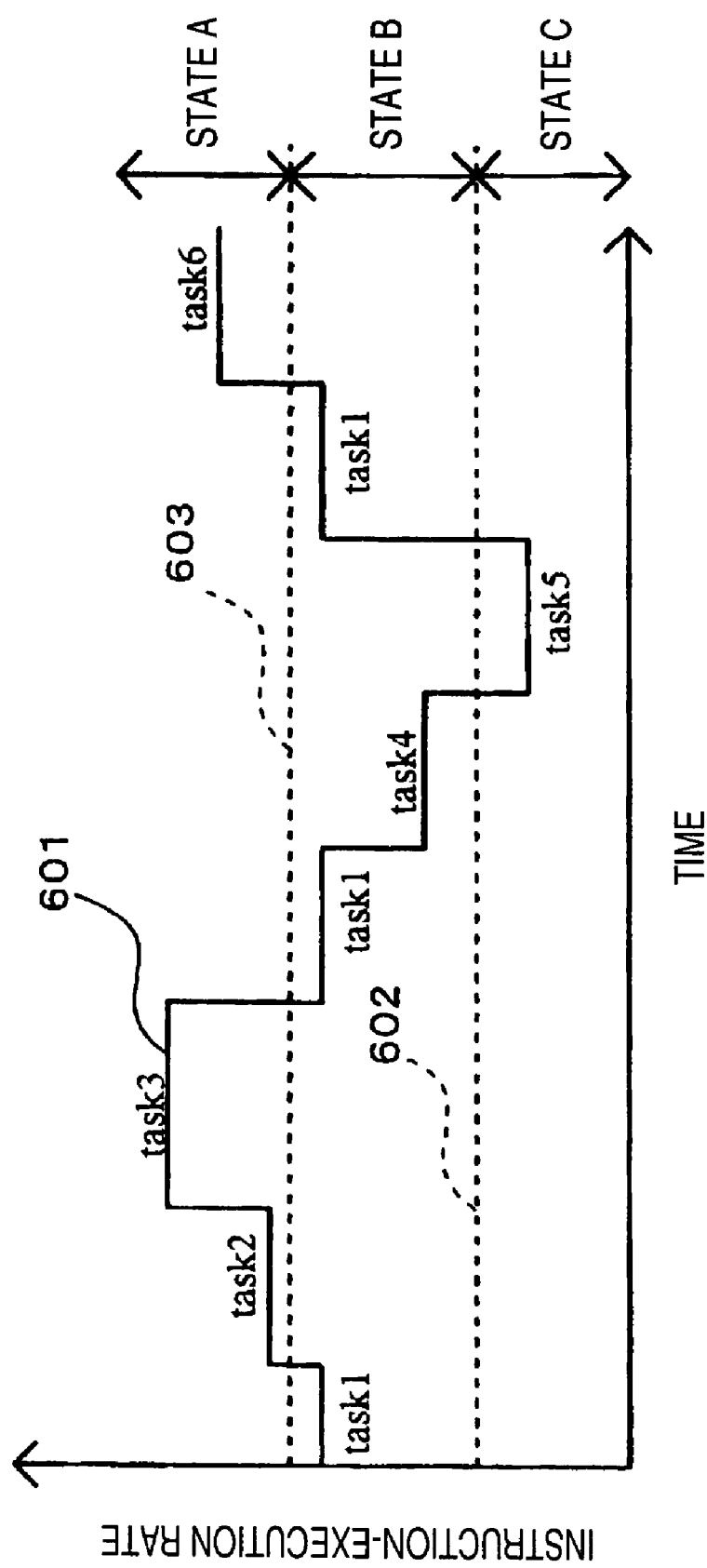
FIG. 5 is a graph illustrating variation of an instruction-execution rate for every task.

Utilization efficiency of the built-in memory 103 and the cache memory 104 in the processor block 112 differs from task to task. That is, a method of utilizing the built-in memory 103 and the cache memory 104 differ form task to task, and it can be expected that the difference in the utilization method is reflected on the instruction-execution rate. FIG. 5 is a graph illustrating variation of an instruction-execution rate for every task. As shown in FIG. 5, an instruction-execution rate 601 is varied for every switching of the task. After switching over from the task 1 to the task 2, since the instruction-execution rate 601 calculated from the respective count values of the instruction execution counter 202 and the clock counter 203 becomes higher than the high reference value 603, the comparator 206 of the clock controller 110 judges that the rate exists in the state A. Accordingly, the clock controller 110 outputs the clock control signal for raising the clock frequency of the CPU 101 and lowering the clock frequencies of the bus controller 113 and the external device 114

Meanwhile, after switching over from the task 4 to the task 5, since the instruction-execution rate 601 calculated from the respective count values of the instruction execution counter 202 and the clock counter 203 has a value lower than a low reference value 602, the comparator 206 of the clock controller 110 judges that the value exists in the state C. Accordingly, the clock controller 110 outputs the clock control signal for lowering the clock frequency of the CPU 101 and raising the clock frequencies of the bus controller 113 and the external device 114.

According to the embodiment, the clock frequencies of the processor block 112, the bus controller 113, and the external device 114 are controlled for every task, and in the same manner as the first embodiment, the source voltage or circuit board voltage is controlled in accordance with the clock frequency, and thus achieving the power consumption suitable for the task.

In the measurement of the instruction-execution rate for every task, it may be not necessary to store the instruction-execution rate for every task, but may be necessary only to store the instruction-execution rate for the tasks of the upper and lower position. The number is set in accordance with the size of resource such as the register or the memory used in order to store the task.

The above-mentioned processor system of the first and the second embodiment can be mounted on the mobile device such as a cellular phone and a PDA. The mobile device may include plural processor systems.

A processor system according to the invention is useful as a system for low power consumption while satisfying required processing capability.

What is claimed is:

1. A processor system including a processor which has an internal memory, an external memory, and a bus controller which controls a bus to which the processor and the external memory are connected, the system comprising:
    a measurement unit for measuring an instruction-execution rate of the processor;
    a clock controller for supplying the processor, the external memory, and the bus controller with clock signals having clock frequencies corresponding to the instruction-execution rate measured by the measurement unit, respectively; and
    a voltage controller for controlling a source voltage or a threshold voltage which are supplied to the processor, the external memory, and the bus controller, in accordance with the respective clock frequencies of clock signals supplied to the processor, the external memory, and the bus controller,
    wherein the clock controller has a comparator for comparing the instruction-execution rate obtained by the measurement unit with a reference value, and
    wherein the clock controller raises the clock frequencies of the processor and lowers the clock frequencies of the external memory and the bus controller, when the instruction-execution rate is not less than the reference value.

2. The processor system according to claim 1, wherein the voltage controller decreases a source voltage supplied to means which is supplied with the clock signal having a low clock frequency and increases a source voltage supplied to means which is supplied with the clock signal having a high clock frequency.

3. The processor system according to claim 1, wherein the voltage controller increases a threshold voltage of a transistor of means which is supplied the clock signal having a low clock frequency and decreases a threshold voltage of a transistor of means which is supplied the clock signal having a high clock frequency.

4. The processor system according to claim 1,
    wherein the measurement unit has a task information processing section determining a switching of a task in the processor on the basis of task information on the task performed by the processor, and
    wherein the clock controller controls the clock frequencies of the clock signals supplied to the processor, the external memory, and the bus controller, respectively, whenever the task is switched.

* * * * *